(12) United States Patent
Nanbu et al.

(10) Patent No.: US 12,496,946 B2
(45) Date of Patent: Dec. 16, 2025

(54) COVER MATERIAL ATTACHMENT

(71) Applicant: YKK CORPORATION, Tokyo (JP)

(72) Inventors: Madoka Nanbu, Kurobe (JP); Takayoshi Tanaka, Kurobe (JP); Wanli Zhang, Kurobe (JP); Tsuyoshi Minato, Kurobe (JP)

(73) Assignee: YKK CORPORATION (JP)

( * ) Notice: Subject to any disclaimer, the term of this patent is extended or adjusted under 35 U.S.C. 154(b) by 137 days.

(21) Appl. No.: 18/230,440

(22) Filed: Aug. 4, 2023

(65) Prior Publication Data

US 2024/0051445 A1 Feb. 15, 2024

(30) Foreign Application Priority Data

Aug. 10, 2022 (JP) .................. 2022-127670

(51) Int. Cl.
*B60N 2/58* (2006.01)
(52) U.S. Cl.
CPC .................. *B60N 2/5825* (2013.01)
(58) Field of Classification Search
CPC ...... B60N 2/5825; B60N 2/5816; A47C 31/02
USPC ............. 297/452.58, 452.59, 452.6
See application file for complete search history.

(56) References Cited

U.S. PATENT DOCUMENTS

| | | | |
|---|---|---|---|
| 7,506,939 B2 * | 3/2009 | Brockschneider ... | B60N 2/5825 297/452.6 |
| 7,559,100 B2 | 7/2009 | Pedde et al. | |
| 11,679,704 B1 * | 6/2023 | Gillan ................ | B60N 2/72 297/452.38 |
| 11,724,626 B2 * | 8/2023 | Aoki .................. | B60N 2/5642 297/452.6 |
| 11,772,533 B2 * | 10/2023 | Yonezawa ........... | B60N 2/5825 24/455 |

(Continued)

FOREIGN PATENT DOCUMENTS

| | | |
|---|---|---|
| DE | 112023000755 T5 | 11/2024 |
| JP | H06-045600 U | 6/1994 |

(Continued)

OTHER PUBLICATIONS

Nanbu, Madoka; Request for the Submission of an Opinion for Republic of Korea Patent Application No. 10-2023-0103541, filed Aug. 8, 2023, mailed Jan. 23, 2025, 11 pgs.

(Continued)

*Primary Examiner* — Jose V Chen
(74) *Attorney, Agent, or Firm* — Taylor Duma LLP

(57) ABSTRACT

A cover material attachment includes: a base to be installed in a groove of a cushion material; a first support and a second support that are provided upright on the base toward an opening of the groove, and are opposed to each other in a width direction of the groove; a first protrusion and a second protrusion that respectively protrude from the first and second supports in respective directions that bring the first and second protrusions closer to each other, and are to be engaged with an engaging member; and a first frame and a second frame that are provided upright on the base toward the opening of the groove and are opposed to each other in the width direction of the groove. The first and second frames each include a guide configured to guide the engaging member to a space between the first protrusion and the second protrusion.

8 Claims, 7 Drawing Sheets

(56) References Cited

U.S. PATENT DOCUMENTS

| | | | | |
|---|---|---|---|---|
| 2002/0074845 | A1* | 6/2002 | Perske | B60N 2/5825 |
| | | | | 297/452.6 |
| 2008/0224509 | A1* | 9/2008 | Demick | B60N 2/5825 |
| | | | | 297/218.2 |
| 2009/0033131 | A1* | 2/2009 | Clauser | B68G 7/052 |
| | | | | 297/218.4 |
| 2009/0165263 | A1 | 7/2009 | Smith | |
| 2010/0117434 | A1* | 5/2010 | Galbreath | B60N 2/5825 |
| | | | | 297/452.58 |
| 2011/0227390 | A1* | 9/2011 | Lovasz | B60N 2/5825 |
| | | | | 297/452.58 |
| 2012/0112515 | A1* | 5/2012 | Labish | B68G 7/12 |
| | | | | 29/428 |
| 2012/0306256 | A1* | 12/2012 | Okuyama | A47C 31/02 |
| | | | | 297/452.6 |
| 2013/0117973 | A1* | 5/2013 | Murasaki | F16B 5/06 |
| | | | | 24/581.11 |
| 2015/0328808 | A1* | 11/2015 | Sasaki | B60N 2/5825 |
| | | | | 264/46.4 |
| 2016/0249746 | A1* | 9/2016 | Saiga | A47C 31/023 |
| | | | | 24/545 |
| 2016/0280105 | A1* | 9/2016 | Sato | B60N 2/5825 |
| 2016/0280106 | A1 | 9/2016 | Sato et al. | |
| 2017/0057807 | A1* | 3/2017 | Agonia | B68G 7/12 |
| 2018/0229791 | A1* | 8/2018 | Sugiyama | B60N 2/5825 |
| 2019/0104859 | A1* | 4/2019 | Murasaki | B60N 2/5816 |
| 2019/0142181 | A1* | 5/2019 | Matsumura | B68G 7/05 |
| | | | | 297/452.59 |
| 2019/0344690 | A1* | 11/2019 | Shindo | B60N 2/5825 |
| 2020/0262323 | A1* | 8/2020 | Robinson | B60N 2/5866 |
| 2021/0053472 | A1* | 2/2021 | Eldridge | A47C 31/023 |
| 2021/0078473 | A1* | 3/2021 | Ren | B29C 44/1271 |
| 2022/0242287 | A1* | 8/2022 | Cuerda | B60N 2/5825 |
| 2022/0410775 | A1 | 12/2022 | Aoki et al. | |
| 2023/0085792 | A1 | 3/2023 | Chinomi et al. | |
| 2023/0264615 | A1* | 8/2023 | Yonezawa | B60N 2/5825 |
| | | | | 24/455 |
| 2023/0331126 | A1 | 10/2023 | Aoki et al. | |
| 2024/0051445 | A1* | 2/2024 | Nanbu | B60N 2/5825 |
| 2024/0077095 | A1* | 3/2024 | Adachi | F16B 2/22 |
| 2024/0382013 | A1* | 11/2024 | Chinomi | A47C 31/02 |
| 2025/0059022 | A1* | 2/2025 | Inoue | B68G 7/12 |
| 2025/0116283 | A1* | 4/2025 | Nakada | A47C 31/023 |

FOREIGN PATENT DOCUMENTS

| | | |
|---|---|---|
| JP | 2016186325 A* | 10/2016 |
| JP | 7017285 B2 | 2/2022 |

OTHER PUBLICATIONS

Nanbu, Madoka; Written Decision on Registration for Republic of Korea Patent Application No. 10-2023-0103541, filed Aug. 8, 2023, mailed Jul. 28, 2025, 8 pgs.

Nanbu, Madoka; Office Action for German Patent Application No. 102023207641.1, filed Aug. 8, 2023, mailed Sep. 17, 2025, 8 pgs.

* cited by examiner

COVER MATERIAL ATTACHMENT

CROSS REFERENCE TO RELATED APPLICATIONS

The entire disclosure of Japanese Patent Application No. 2022-127670 filed Aug. 10, 2022 is expressly incorporated by reference herein.

TECHNICAL FIELD

The invention relates to a cover material attachment that attaches a cover material to a cushion material.

BACKGROUND ART

Many seats, chairs, etc., are each provided with a cushion material on a part such as a seat surface or a back pad that is to come into contact with a human body. A surface of the cushion material is covered with a cover material. Such seats, chairs, etc., have been widely used. A cover material attachment has been known as a means of attaching the cover material to the cushion material.

For example, a cover material attachment (a clip) disclosed in Patent Literature 1 (JP 6-45600 U) is installed in a groove of a cushion material and is able to attach a cover material to the cushion material by being engaged with an engaging member (a suspender) attached to the cover material. The cover material attachment includes a pair of protrusions opposed to each other. The engaging member is inserted between the pair of protrusions, thereby being engaged with the cover material attachment. Further, each of the pair of protrusions has a guide surface that guides the engaging member. This makes it possible to allow the engaging member to be inserted between the pair of protrusions even if inclination or positional deviation of the engaging member occurs.

In the cover material attachment disclosed in Patent Literature 1, however, when a pressing force is applied to the cushion material from a seating surface, for example, during use of the seat, the pressing force is transmitted to the respective guide surfaces of the pair of protrusions, which can cause the cover material attachment to undergo elastic deformation and widen a space between the pair of protrusions. Accordingly, the cover material attachment of Patent Literature 1 has an issue in that an engaging state with the engaging member is easily released.

SUMMARY OF THE INVENTION

An object of the invention is to provide a cover material attachment that is able to reliably engage with an engaging member and also to retain an engaging state with the engaging member.

First Aspect

A cover material attachment according to a first aspect of the invention, which is to be installed in a groove provided in a cushion material of a seat and is to be engaged with an engaging member attached to a cover material, includes: a base to be installed in the groove of the cushion material; a first support and a second support that are provided upright from the base toward an opening of the groove, and are opposed to each other in a width direction of the groove; a first protrusion and a second protrusion that respectively protrude from the first support and the second support in respective directions that bring the first protrusion and the second protrusion closer to each other, and are to be engaged with the engaging member; and a first frame and a second frame that are provided upright from the base toward the opening of the groove and are opposed to each other in the width direction of the groove, the first frame and the second frame being configured to guide the engaging member to a space between the first protrusion and the second protrusion, in which the first frame and the second frame are respectively configured to undergo elastic deformation independently of the first support and the second support when a load is applied on the side of the groove, on which the opening is provided.

Such a configuration makes it possible for the first frame and the second frame to guide the engaging member to the space between the first protrusion and the second protrusion. As a result, it is possible to reliably engage the cover material attachment and the engaging member with each other.

Further, the first frame and the second frame are respectively able to undergo elastic deformation independently of the first support supporting the first protrusion and the second support supporting the second protrusion. Accordingly, when a pressing force applied to the cushion material from a seating surface is transmitted to the first frame or the second frame during use of the seat, for example, the first frame and the second frame undergo elastic deformation with the first support and the second support not undergoing elastic deformation. This makes it possible to prevent the space between the first protrusion provided in the first support and the second protrusion provided in the second support from being widened. As a result, it is possible to retain the engaging state between the cover material attachment and the engaging member.

Second Aspect

In the cover material attachment according to the first aspect of the invention, it is preferable that the first frame and the second frame each include a pair of legs provided upright on the base, and a connecting portion that couples respective end portions of the pair of legs.

Such a configuration makes it possible to dispose the first frame and the second frame close to the first support and the second support, respectively, while preventing the first frame and the second frame from interfering with the first support and the second support, respectively. Accordingly, it is possible to reduce a width of the cover material attachment.

Third Aspect

In the cover material attachment according to the second aspect of the invention, it is preferable that the first support be disposed between the pair of legs of the first frame, and the second support be disposed between the pair of legs of the second frame.

Such a configuration makes it possible to reduce the width of the cover material attachment more preferably.

Fourth Aspect

In the cover material attachment according to the second aspect or the third aspect of the invention, it is preferable that the first support have a space that is continuous from between the first support and each of the pair of legs of the first frame to between the first support and the connecting portion of the first frame, and that the second support have a space that is continuous from between the second support and each of the pair of legs of the second frame to between the second support and the connecting portion of the second frame.

Such a configuration makes it possible for the first frame and the second frame to respectively undergo elastic deformation more preferably independently of the first support and the second support.

Fifth Aspect

In the cover material attachment according to any one of the first to fourth aspects of the invention, it is preferable that the pair of legs of the first frame have a guide surface and the pair of legs of the second frame have a guide surface, the guide surfaces being inclined with respect to a depth direction of the groove in such a manner as to face a side where the guide surfaces oppose each other and the side of the groove, on which the opening is provided.

Such a configuration makes it possible, upon inserting the engaging member into the groove of the cushion material, to preferably guide the engaging member to the space between the first protrusion and the second protrusion.

Sixth Aspect

In the cover material attachment according to the fifth aspect of the invention, it is preferable that the first protrusion have an auxiliary guide surface disposed in a plane identical to a plane in which the guide surface of the first frame in a no-load state is disposed, and that the second protrusion have an auxiliary guide surface disposed in a plane identical to a plane in which the guide surface of the second frame in the no-load state is disposed.

Such a configuration makes it possible, upon inserting the engaging member into the groove of the cushion material, to preferably guide the engaging member to the space between the first protrusion and the second protrusion.

Note that the "no-load state" may be a state in which no external load (e.g., a load of a seated person) is applied to the cushion material.

Seventh Aspect

In the cover material attachment according to the fifth aspect or the sixth aspect of the invention, it is preferable that the first support have an intermediate guide disposed in a plane identical to a plane in which the guide surface of the first frame in a no-load state is disposed, and that the second support have an intermediate guide disposed in a plane identical to a plane in which the guide surface of the second frame in the no-load state is disposed.

Such a configuration makes it possible, upon inserting the engaging member into the groove of the cushion material, to preferably guide the engaging member to the space between the first protrusion and the second protrusion.

Eighth Aspect

In the cover material attachment according to any one of the first to seventh aspects of the invention, it is preferable that the first frame and the second frame each include: a riser portion that extends from the base; a guide that extends from the riser portion in a direction inclined with respect to a depth direction of the groove, the guide being configured to guide the engaging member to the space; and a fixing portion that extends from the guide toward an outer side of the groove in the width direction, and is to be fixed to the cushion material.

Such a configuration makes it possible to increase a fixing strength with respect to the cushion material.

DETAILED DESCRIPTION

Hereinafter, an exemplary embodiment of the invention will be described with reference to the attached drawings.

Figure 1:
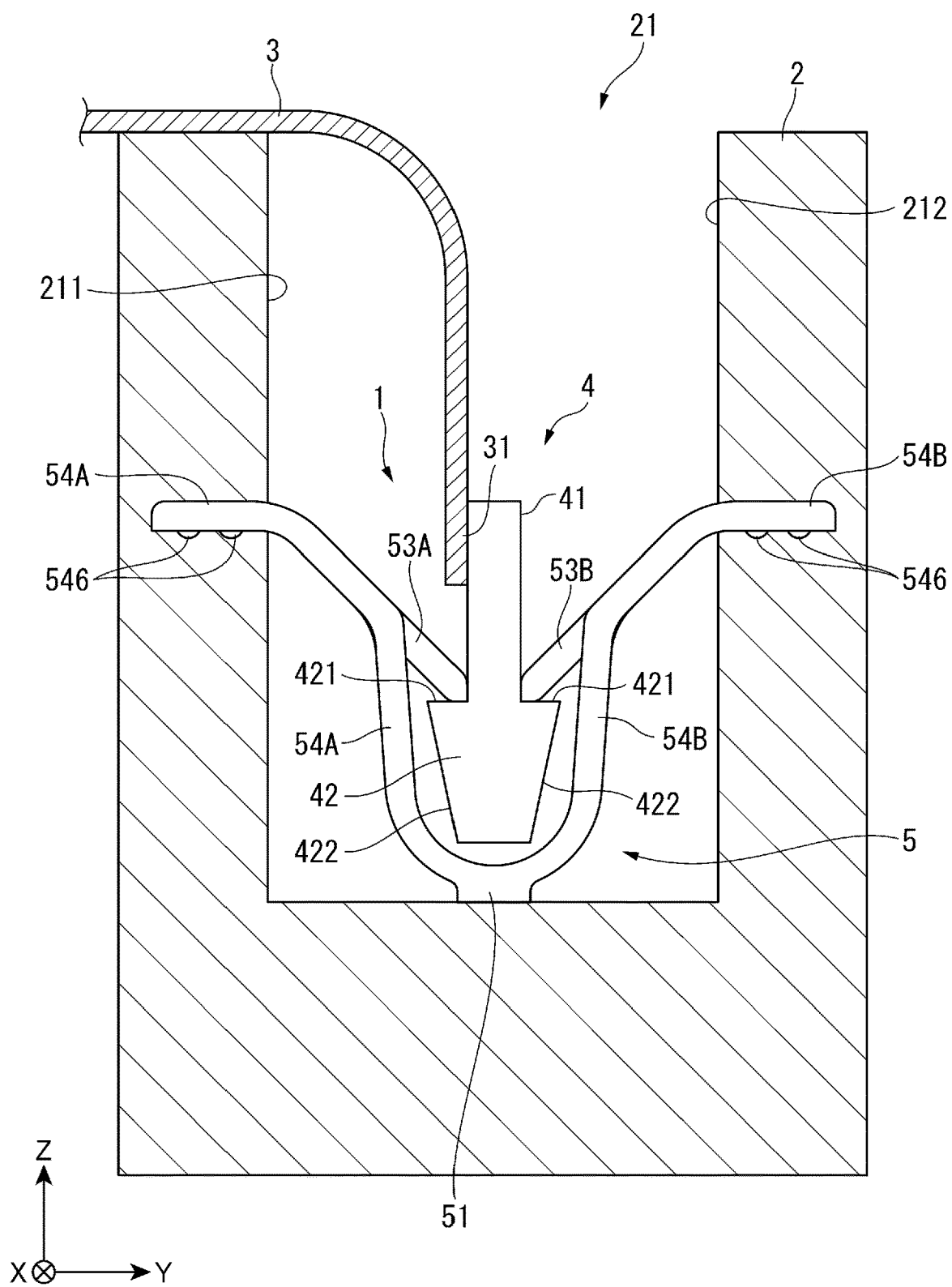
FIG. 1 is a cross-sectional view of a state where a cover material attachment according to one exemplary embodiment of the invention is installed in a cushion material.

As illustrated in FIG. 1, a cover material attachment 5 according to the exemplary embodiment is included in a cover material attachment structure 1. The cover material attachment structure 1 attaches a cover material 3 to a cushion material 2 that forms a vehicle seat, etc. In other words: the cover material attachment structure 1 includes an engaging member 4 to be attached to the cover material 3, and the cover material attachment 5 to be installed in a groove 21 of the cushion material 2; and the cover material attachment structure 1 is able to attach the cover material 3 to the cushion material 2 by causing the engaging member 4 to be engaged with the cover material attachment 5.

The cushion material 2 includes a plastic urethane foam material such as foamed polyurethane molded into a shape of a seat. The cushion material 2 has the groove 21 in which the cover material attachment structure 1 is to be disposed. The groove 21 has a first side wall surface 211 and a second side wall surface 212 opposed to each other, and extends along any direction on a surface of the cushion material 2 while having an opening on one side in a vertical direction of the cushion material 2.

The cover material 3 is a sheet covering the surface of the cushion material 2, and is, for example, a woven fabric of a synthetic resin. An edge 31 of the cover material 3 is attached to the engaging member 4.

Hereinafter, in describing a configuration of the cover material attachment structure 1, three axis directions, i.e., an X direction, a Y direction, and a Z direction, are used (see FIG. 1). The three axis directions are based on a state in which the engaging member 4 is engaged with the cover material attachment 5. For example, a length direction of the cover material attachment structure 1 is defined as the X direction, a horizontal direction of the cover material attachment structure 1 is defined as the Y direction, and a vertical direction of the cover material attachment structure 1 is defined as the Z direction. Note that, in a state in which the cover material 3 is provided on the cushion material 2 by the cover material attachment structure 1 (see FIG. 1), the X direction corresponds to a length direction of the groove 21 of the cushion material 2, the Y direction corresponds to a width direction of the groove 21, and the Z direction corresponds to a depth direction of the groove 21. For convenience of explanation, a direction toward one side (an upper side) in the Z direction is defined as a +Z direction, a direction toward the other side (a lower side) in the Z direction is defined as a −Z direction, and the groove 21 is defined to have the opening in the cushion material 2 in the +Z direction.

The engaging member 4 is a so-called suspender hanging from the edge 31 of the cover material 3.

Specifically, the engaging member 4 includes an attachment portion 41 to which the edge 31 of the cover material 3 is to be attached, and an insert portion 42 provided at an end on a −Z side of the attachment portion 41.

The attachment portion 41 may be, for example, a resin that is integrally molded with the insert portion 42, or may be, for example, a tape member such as a nonwoven fabric that is insert-molded to the insert portion 42. The attachment portion 41 is attached to the cover material 3 by means of, for example, sewing.

The insert portion 42 is, for example, a molded piece of a thermoplastic resin such as polypropylene, and has an anchor shape protruding on the −Z side from the attachment portion 41. The insert portion 42 has a pair of to-be-engaged surfaces 421 facing the +Z direction and a pair of inclined surfaces 422 facing the −Z direction. The pair of to-be-engaged surfaces 421 extends from the attachment portion 41 toward both sides in the Y direction. The pair of inclined surfaces 422 is inclined with respect to the Z direction in such a manner that a dimension of the insert portion 42 in the Y direction decreases toward the −Z direction.

Note that the engaging member 4 is continuously provided along the X direction, and a length dimension of the engaging member 4 in the X direction is appropriately set. For example, the X-direction dimension of the engaging member 4 is preferably longer than an X-direction dimension of the cover material attachment 5 to be described later.

The cover material attachment 5 is, for example, a molded piece of a thermoplastic resin such as polypropylene. A configuration of the cover material attachment 5 will be described with reference to FIGS. 1 to 4.

Figure 2:
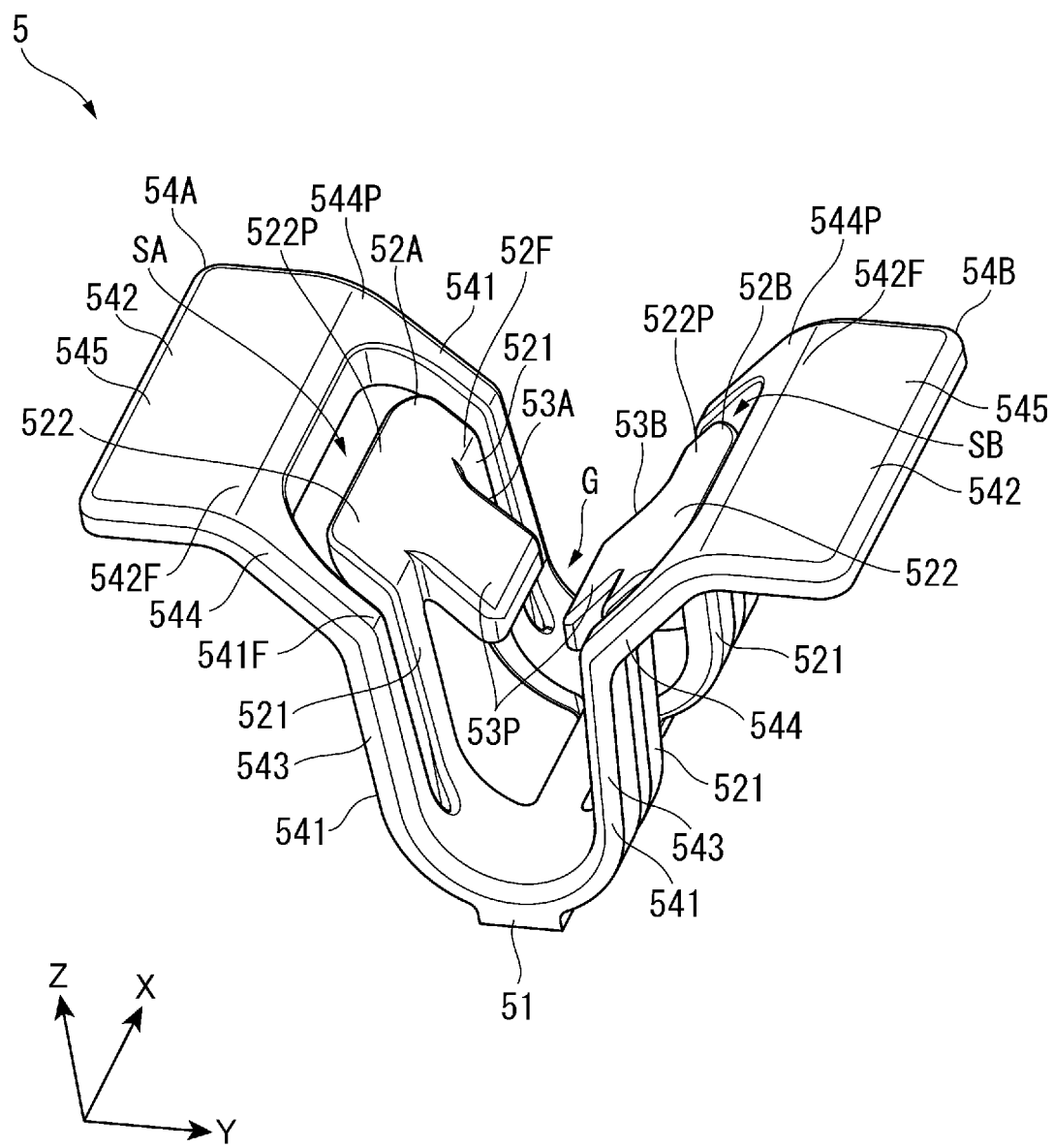
FIG. 2 is a perspective view of the cover material attachment according to the exemplary embodiment.

As illustrated in FIG. 2, the cover material attachment 5 includes: a base 51; a first support 52A and a second support 52B that are provided upright on the base 51 toward a +Z side, and are opposed to each other in the Y direction; a first protrusion 53A and a second protrusion 53B that respectively protrude from the first support 52A and the second support 52B in respective directions that bring them closer to each other (inward in the Y direction); and a first frame 54A and a second frame 54B that are provided upright on the base 51 toward the +Z side, and are opposed to each other in the Y direction.

Note that the cover material attachment 5 according to the exemplary embodiment has a shape that is symmetrical with respect to an XZ plane at a center in the Y direction. In the following description of the cover material attachment 5, the first support 52A and the second support 52B may be referred to as supports 52A and 52B, the first protrusion 53A and the second protrusion 53B may be referred to as protrusions 53A and 53B, and the first frame 54A and the second frame 54B may be referred to as frames 54A and 54B.

Figure 4:
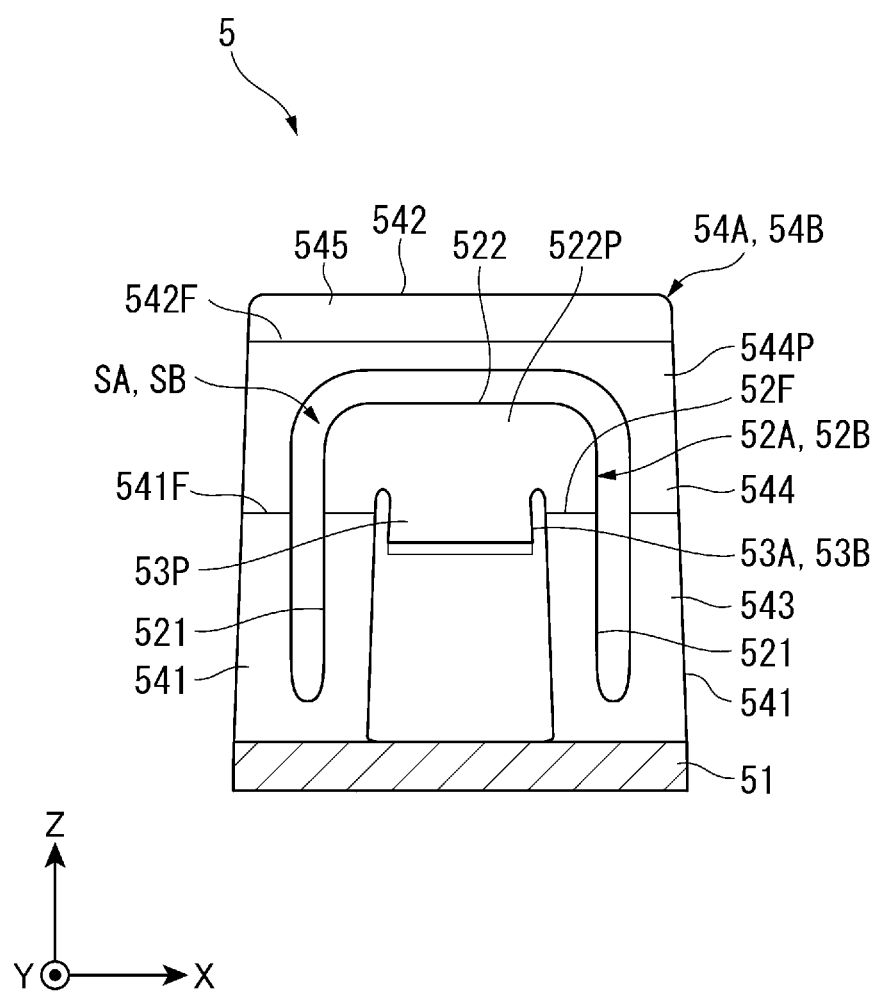
FIG. 4 is a cross-sectional view taken along a line IV-IV in FIG. 3.

FIG. 4 illustrates a configuration of the cover material attachment 5 on one side in the Y direction (including the first support 52A, the first protrusion 53A, and the first frame 54A); however, a configuration of the cover material attachment 5 on the other side in the Y direction (including the second support 52B, the second protrusion 53B, and the second frame 54B) is also similarly illustrated.

The base 51 has, for example, a plate shape. In the exemplary embodiment, the base 51 is simply placed on the bottom of the groove 21 of the cushion material 2. However, the base 51 may be embedded in the cushion material 2 by being extended longer in the Y direction than a length of the groove 21 in the width direction.

As illustrated in FIGS. 2 and 4, the supports 52A and 52B each include a pair of legs 521, and an intermediate guide 522. The pair of legs 521 of the support 52A and the pair of legs 521 of the support 52B are provided upright on the base 51 with a space interposed therebetween in the Y direction. The intermediate guide 522 couples respective end portions of the pair of legs 521 to each other.

Here, in each of the supports 52A and 52B, a bent portion 52F is provided along the X direction at any position in the Z direction in the pair of legs 521 (for example, on the +Z side of the space G between the protrusions 53A and 53B). The supports 52A and 52B are bent outward in the Y direction at the respective bent portions 52F. Thus, the respective intermediate guides 522 of the supports 52A and 52B have their respective intermediate guide surfaces 522P facing inward in the Y direction and also facing the +Z side.

The first protrusion 53A protrudes from the intermediate guide 522 of the first support 52A in the +Y direction, and the second protrusion 53B protrudes from the intermediate guide 522 of the second support 52B in the −Y direction. The protrusions 53A and 53B interpose the space G therebetween in the Y direction. Further, the protrusions 53A and 53B have respective auxiliary guide surfaces 53P facing inward in the Y direction and also facing the +Z side.

As illustrated in FIGS. 2 and 4, the frames 54A and 54B each include a pair of legs 541, and a connecting portion 542. The pair of legs 541 of the frame 54A and the pair of legs 541 of the frame 54B are provided upright on the base 51 with a space interposed therebetween in the Y direction. The connecting portion 542 couples respective end portions of the pair of legs 541 to each other. Further, the frames 54A and 54B each have an inner space surrounded by the pair of legs 541 and the connecting portion 542.

The first support 52A is disposed between the pair of legs 541 of the first frame 54A (i.e., in the inner space of the first frame 54A). The first support 52A thus has a space SA that is continuous from between the first support 52A and each of the pair of legs 541 of the first frame 54A to between the first support 52A and the connecting portion 542 of the first frame 54A. Owing to the space SA between the first frame 54A and the first support 52A, the first frame 54A is able to undergo elastic deformation in the Y direction independently of the first support 52A.

Similarly, the second support 52B is disposed between the pair of legs 541 of the second frame 54B (i.e., in the inner space of the second frame 54B). The second support 52B thus has a space SB that is continuous from between the second support 52B and each of the pair of legs 541 of the second frame 54B to between the second support 52B and the connecting portion 542 of the second frame 54B. Owing to the space SB between the second frame 54B and the second support 52B, the second frame 54B is able to undergo elastic deformation in the Y direction independently of the second support 52B.

Here, in each of the frames 54A and 54B, a bent portion 541F is provided along the X direction at any position in the Z direction in the pair of legs 541 (for example, on the +Z side of the space G between the protrusions 53A and 53B and at the same position as the bent portion 52F). Further, a bent portion 542F is provided along the X direction at any position in the connecting portion 542.

The frames 54A and 54B are each bent at two bent portions 541F and 542F and are bent outward in the Y direction. Thus, of each of the frames 54A and 54B: a portion on the −Z side relative to the bent portion 541F forms a riser portion 543 extending in the +Z direction from the base 51; a portion between the two bent portions 541F and 542F forms a guide 544 inclined with respect to the Z direction; and a portion on an outer side in the Y direction relative to the bent portion 542F forms a fixing portion 545 disposed along an XY plane.

The guides 544 are disposed on the +Z side relative to the space G between the protrusions 53A and 53B. Further, the guides 544 have respective guide surfaces 544P facing inward in the Y direction and also facing the +Z side. In the exemplary embodiment, the guide surface 544P of the first frame 54A is provided from a portion in a region on the +Z side of the pair of legs 541 of the first frame 54A to a portion in a region on an inner side of the connecting portion 542 in the Y direction. Similarly, the guide surface 544P of the second frame 54B is provided from a portion in a region on the +Z side of the pair of legs 541 of the second frame 54B to a portion in a region on an inner side of the connecting portion 542 in the Y direction.

Figure 3:
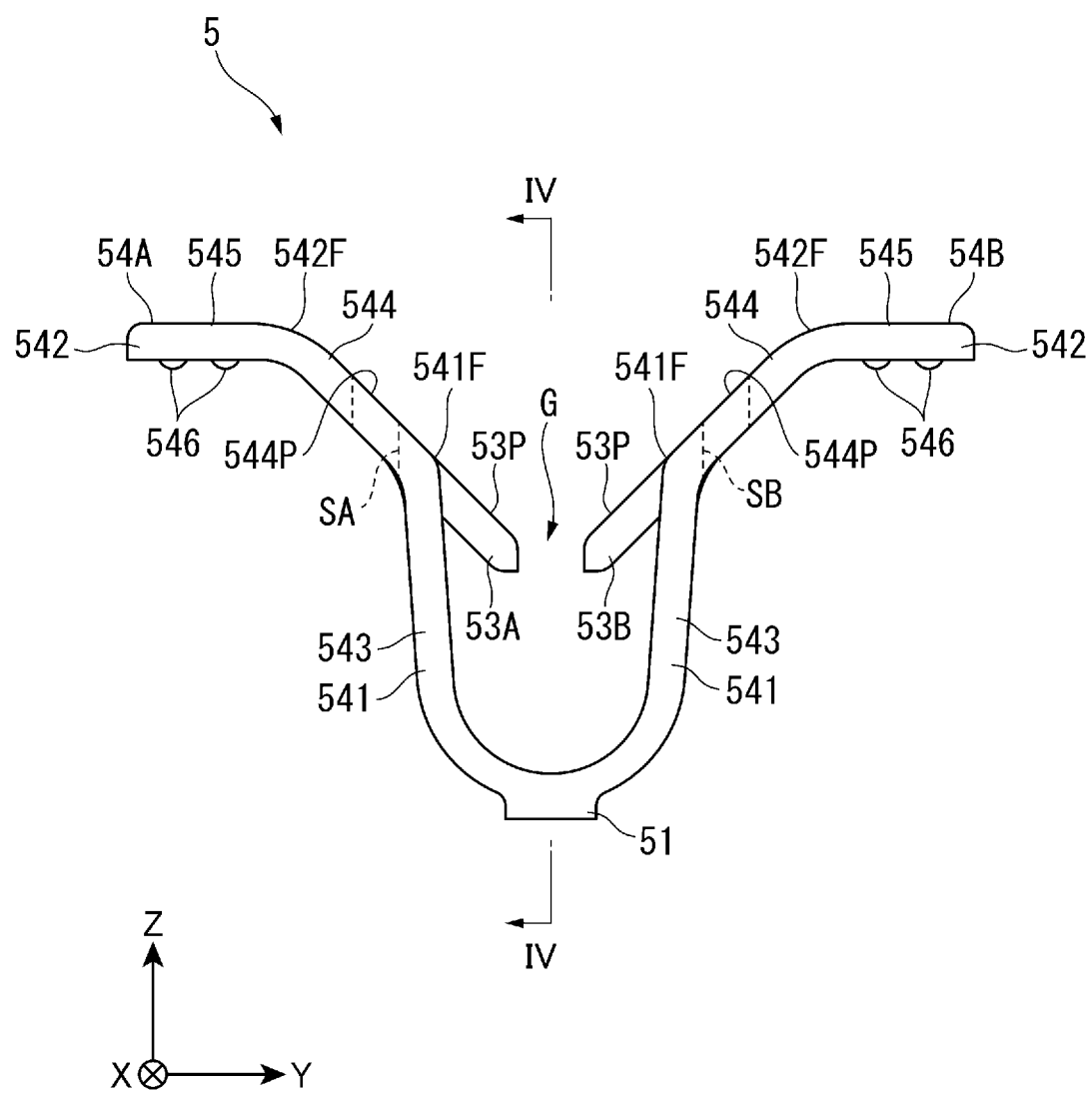
FIG. 3 is a side view of the cover material attachment according to the exemplary embodiment.

The fixing portion 545 is disposed in such a state as to be inserted into the first side wall surface 211 or the second side wall surface 212 of the cushion material 2, and is fixed to the cushion material 2. As illustrated in FIG. 3, multiple projections 546 for improving a degree of adhesion to the cushion material 2 are provided on a back surface, which faces the −Z side, of the fixing portion 545.

The cover material attachment 5 described above has, as surfaces for guiding the engaging member 4: the respective guide surfaces 544P of the frames 54A and 54B; the respective intermediate guide surfaces 522P of the supports 52A and 52B; and the respective auxiliary guide surfaces 53P of the protrusions 53A and 53B.

Specifically, the intermediate guide surface 522P of the first support 52A is disposed between the guide surface 544P of the first frame 54A and the auxiliary guide surface 53P of the first protrusion 53A. Further, the guide surface 544P and the intermediate guide surface 522P are disposed on the +Z side relative to the auxiliary guide surface 53P. The guide surface 544P of the first frame 54A, the intermediate guide surface 522P of the first support 52A, and the auxiliary guide surface 53P of the first protrusion 53A are disposed in an identical plane.

Similarly, the intermediate guide surface 522P of the second support 52B is disposed between the guide surface 544P of the second frame 54B and the auxiliary guide surface 53P of the second protrusion 53B. Further, the guide surface 544P and the intermediate guide surface 522P are disposed on the +Z side relative to the auxiliary guide surface 53P. The guide surface 544P of the second frame 54B, the intermediate guide surface 522P of the second support 52B, and the auxiliary guide surface 53P of the second protrusion 53B are disposed in an identical plane.

Method of Attaching Cover Material

Figure 5:
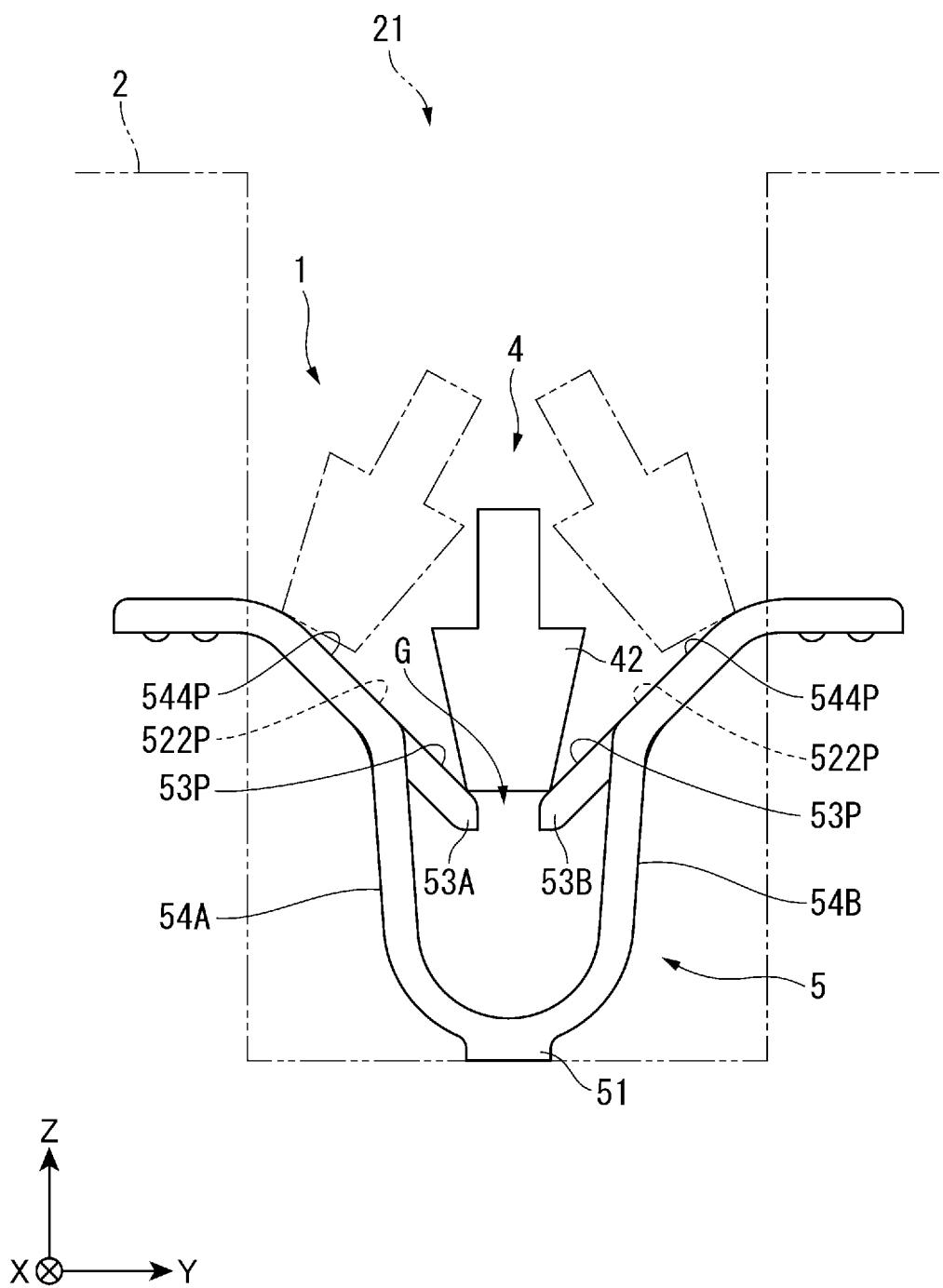
FIG. 5 is a diagram for describing a method of attaching a cover material using the cover material attachment according to the exemplary embodiment, which illustrates a state of an engaging member before being inserted into the cover material attachment.
Figure 6:
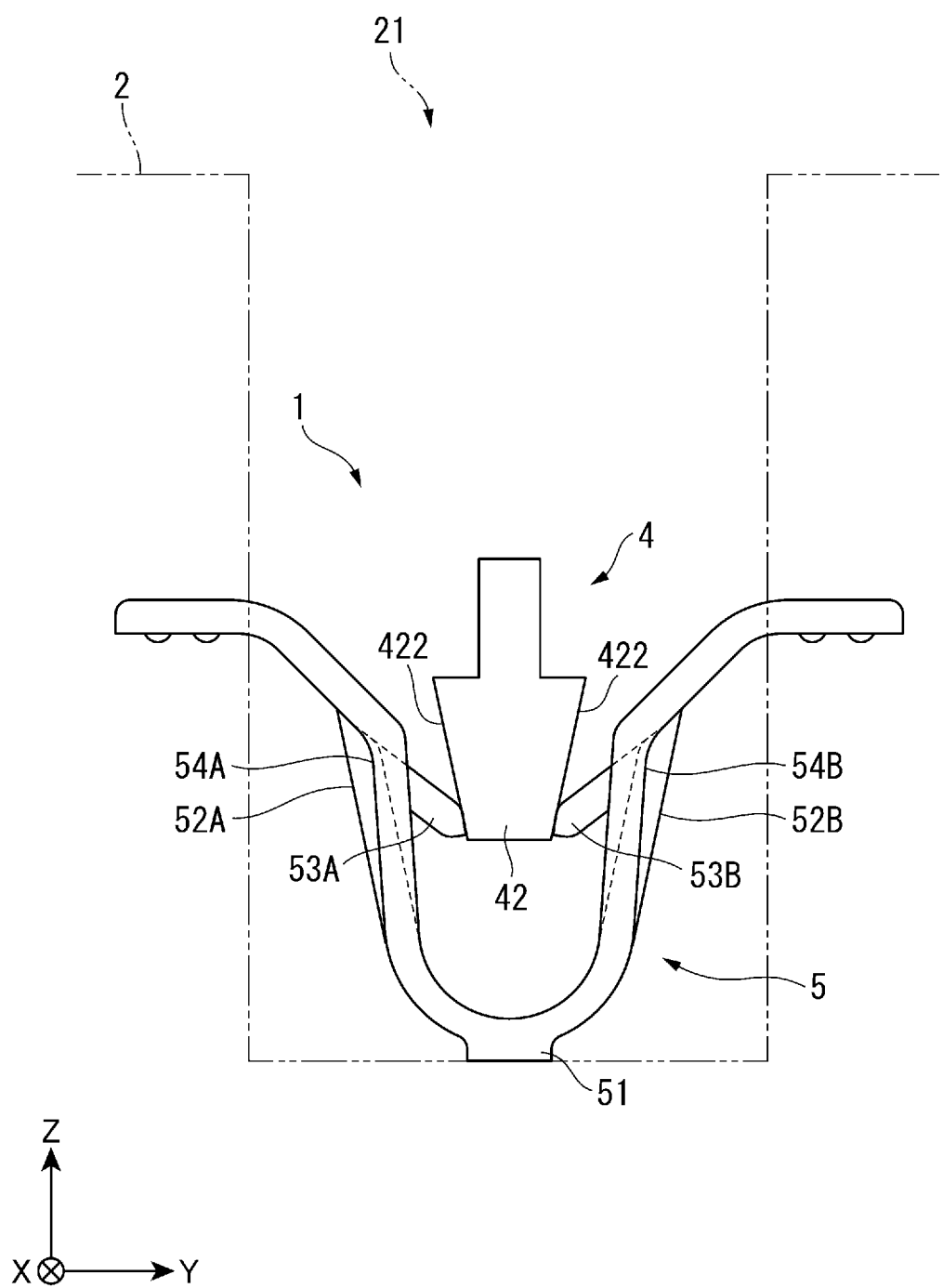
FIG. 6 is a diagram for describing the method of attaching the cover material using the cover material attachment according to the exemplary embodiment, which illustrates a state where the engaging member is being inserted into the cover material attachment.

A method of attaching the cover material 3 with use of the cover material attachment 5 according to the exemplary embodiment will be described further with reference to FIGS. 5 and 6. In FIGS. 5 and 6, for the sake of simplifying the drawings, the illustration of the cover material 3 is omitted, and a basic outline of the groove 21 of the cushion material 2 is indicated by a two-dot chain line.

First, an operator prepares the engaging member 4 on which the cover material 3 is mounted and the cushion material 2 in which the cover material attachment 5 is installed in the groove 21, and disposes the cover material 3 in such a manner as to cover the cushion material 2. Thereafter, an optional pressing means inserts the engaging member 4 into the groove 21 of the cushion material 2, and applies a pressing force in the −Z direction to the engaging member 4.

As illustrated in FIG. 5, upon inserting the engaging member 4 into the groove 21, an attitude of the engaging member 4 may be inclined with respect to the Z direction, or a position of the engaging member 4 may be deviated from the center of the cover material attachment 5 in the Y direction. In such a case, the insert portion 42 of the engaging member 4 is guided toward the center of the cover material attachment 5 in the Y direction, that is, the space G between the protrusions 53A and 53B, by being pressed against any one or more of the guide surfaces of the cover material attachment 5 (i.e., the respective guide surfaces 544P of the frames 54A and 54B, the respective intermediate guide surfaces 522P of the supports 52A and 52B, and the respective auxiliary guide surfaces 53P of the protrusions 53A and 53B). Thus, the insert portion 42 of the engaging member 4 is inserted into the space G between the protrusions 53A and 53B of the cover material attachment 5.

As illustrated in FIG. 6, upon inserting the insert portion 42 of the engaging member 4 into the space G between the protrusions 53A and 53B of the cover material attachment 5, the inclined surfaces 422 of the insert portion 42 are pressed against the protrusions 53A and 53B. This causes the supports 52A and 52B to undergo elastic deformation outward in the Y direction and widens the space between the protrusions 53A and 53B. As illustrated in FIG. 1, when the insert portion 42 passes over the protrusions 53A and 53B, the supports 52A and 52B return to their original shapes, and the to-be-engaged surfaces 421 of the insert portion 42 engage with the protrusions 53A and 53B. This allows the engaging member 4 to be held in the cover material attachment 5.

Thus, the cover material attachment 5 is able to attach the cover material 3 to the cushion material 2.

Effects of Exemplary Embodiment

In the cover material attachment 5 according to the exemplary embodiment, the frames 54A and 54B are able to guide the engaging member 4 to the space G between the protrusions 53A and 53B, as described above. As a result, the cover material attachment 5 according to the exemplary embodiment is able to reliably engage with the engaging member 4.

Figure 7:
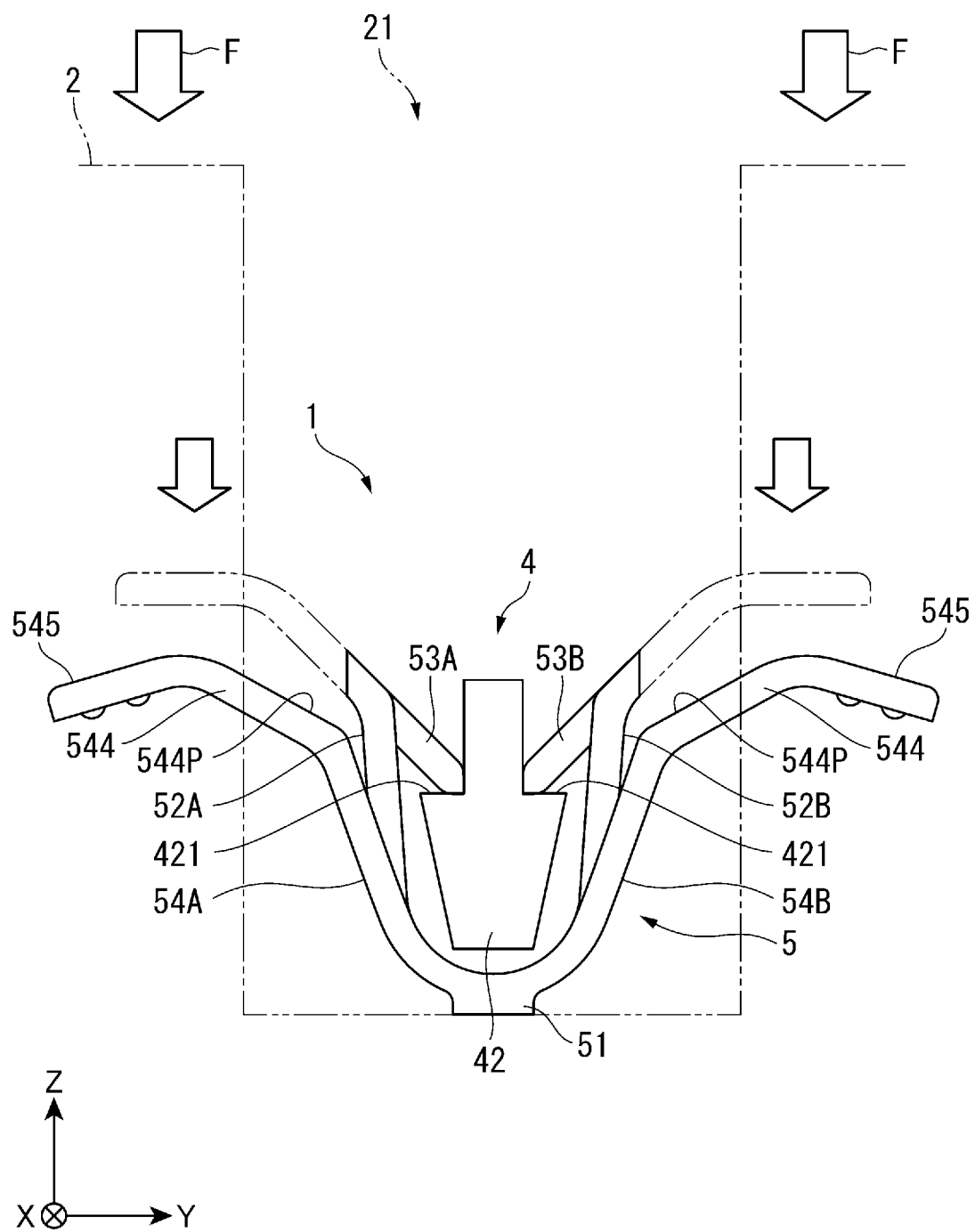
FIG. 7 is a diagram for describing an operation of the cover material attachment according to the exemplary embodiment.

Further, the frames 54A and 54B are respectively able to undergo elastic deformation independently of the supports 52A and 52B supporting the protrusions 53A and 53B. Accordingly, when a pressing force F applied to the cushion material 2 from a seating surface is transmitted to each of the guide surfaces 544P during use of the seat, for example, as illustrated in FIG. 7, the frames 54A and 54B undergo elastic deformation with the supports 52A and 52B not undergoing elastic deformation. This makes it possible to prevent the space between the protrusions 53A and 53B provided in the supports 52A and 52B from being widened. As a result, the cover material attachment 5 according to the exemplary embodiment is able to retain the engaging state with the engaging member 4.

In the exemplary embodiment, the frames 54A and 54B each include the pair of legs 541 that is provided upright on the base 51, and the connecting portion 542 that couples the respective end portions of the pair of legs 541 to each other. The connecting portion 542 has the guide surface 544P. Such a configuration makes it possible to dispose the frames 54A and 54B close to the supports 52A and 52B, respectively, while preventing the frames 54A and 54B from interfering with the supports 52A and 52B, respectively. Accordingly, it is possible to reduce a width of the cover material attachment 5.

In the exemplary embodiment, the first support 52A is disposed between the pair of legs 541 of the first frame 54A, and the second support 52B is disposed between the pair of legs 541 of the second frame 54B. This makes it possible to reduce the width of the cover material attachment 5 more preferably.

In the exemplary embodiment, the first support 52A has the space SA that is continuous from between the first support 52A and each of the pair of legs 541 of the first frame 54A to between the first support 52A and the connecting portion 542 of the first frame 54A, and the second support 52B has the space SB that is continuous from between the second support 52B and each of the pair of legs 541 of the second frame 54B to between the second support 52B and the connecting portion 542 of the second frame 54B. Such a configuration makes it possible for the frames 54A and 54B to respectively undergo elastic deformation preferably independently of the supports 52A and 52B.

In the exemplary embodiment, the frames 54A and 54B have the respective guide surfaces 544P that are inclined with respect to the Z direction in such a manner as to face inward in the Y direction and also to face the +Z side. Accordingly, upon inserting the engaging member 4 into the groove 21 of the cushion material 2, it is possible to preferably guide the engaging member 4 to the space G between the protrusions 53A and 53B.

In the exemplary embodiment, the protrusions 53A and 53B each have the auxiliary guide surface 53P disposed in the plane identical to the plane in which the guide surface 544P of the first frame 54A (or the second frame 54B) in the no-load state is disposed. Accordingly, upon inserting the engaging member 4 into the groove 21 of the cushion material 2, it is possible to preferably guide the engaging member 4 to the space G between the protrusions 53A and 53B.

In the exemplary embodiment, the first support 52A and the second support 52B each have the intermediate guide surface 522P disposed in the plane identical to the plane in which the guide surface 544P of the first frame 54A (or the second frame 54B) in the no-load state is disposed. Such a configuration makes it possible, upon inserting the engaging member 4 into the groove 21 of the cushion material 2, to preferably guide the engaging member 4 to the space G between the protrusions 53A and 53B.

In the exemplary embodiment, the frames 54A and 54B each include: the riser portion 543 that extends from the base 51; the guide 544 that extends from the riser portion 543 in a direction inclined with respect to the Z direction, and guides the engaging member 4 to the space G; and the fixing portion 545 that extends from the guide 544 toward an outer side of the groove 21 in the Y direction, and is to be fixed to the cushion material 2. According to such a configuration, a fixing strength with respect to the cushion material 2 increases.

Modifications

In the exemplary embodiment, the supports 52A and 52B each include the pair of legs 521, and the frames 54A and 54B each include the pair of legs 541; however, the invention is not limited thereto.

For example, the supports 52A and 52B may each have a plate-shaped leg instead of the pair of legs 521, and the protrusions 53A and 53B may each protrude from such a leg.

Further, the frames 54A and 54B may each have a plate-shaped leg instead of the pair of legs 521. In this case, the frames 54A and 54B are respectively disposed on outer sides of the supports 52A and 52B in the Y direction. Thus, a space is provided between the frame 54A and the support 52A, and a space is provided between the frame 54B and the support 52B. This allows the frames 54A and 54B to respectively undergo elastic deformation independently of the supports 52A and 52B.

In the exemplary embodiment, the supports 52A and 52B may each have no intermediate guide surface 522P. Similarly, the protrusions 53A and 53B may each have no auxiliary guide surface 53P. In other words, in the cover material attachment 5 according to the exemplary embodiment, at least the frames 54A and 54B may serve to guide the engaging member 4.

In the exemplary embodiment, the frames 54A and 54B each have the fixing portion 545 to be inserted into the cushion material 2; however, the invention is not limited thereto. For example, if the base 51 is embedded in the bottom of the groove 21 of the cushion material 2, the frames 54A and 54B are not necessarily fixed to the cushion material 2.

What is claimed is:

1. A cover material attachment that is configured to be installed in a groove provided in a cushion material of a seat and is configured to be engaged with an engaging member attached to a cover material, the cover material attachment comprising:
  a base configured to be installed in the groove of the cushion material;
  a first support and a second support that are provided upright from the base toward an opening of the groove, and are opposed to each other in a width direction of the groove;
  a first protrusion protruding from the first support;
  a second protrusion protruding from the second support; and
  a first frame and a second frame that are provided upright from the base toward the opening of the groove and are opposed to each other in the width direction of the groove,
  wherein;
    the first protrusion and the second protrusion protrude in respective directions that bring the first protrusion and the second protrusion closer to each other with a space being provided therebetween,
    each of the first frame and the second frame includes a guide surface with which the engaging member is guided to the space between the first protrusion and the second protrusion when the guide surface is pressed against the engaging member inserted into the groove,
    the first protrusion and the second protrusion engage with the engaging member inserted into the space therebetween,
    the first frame is configured to provide a space between the first frame and the first support to allow elastic deformation of the first frame independently of the first support when a load is applied on a side of the groove on which the opening is provided, and
    the second frame is configured to provide a space between the second frame and the second support to allow elastic deformation of the second frame independently of the second support when the load is applied on the side of the groove on which the opening is provided.

2. The cover material attachment according to claim 1, wherein the first frame and the second frame each comprise:
a pair of legs provided upright on the base, and
a connecting portion that couples respective end portions of the pair of legs.

3. The cover material attachment according to claim 2, wherein:
the first support is disposed between the pair of legs of the first frame, and
the second support is disposed between the pair of legs of the second frame.

4. The cover material attachment according to claim 2, wherein:
the first support has a space that is continuous from between the first support and each of the pair of legs of the first frame to between the first support and the connecting portion of the first frame, and
the second support has a space that is continuous from between the second support and each of the pair of legs of the second frame to between the second support and the connecting portion of the second frame.

5. The cover material attachment according to claim 2, wherein:
the guide surface of the first frame is provided for each leg of the pair of legs so that the guide surface is inclined with respect to a depth direction of the groove in such a manner as to face the side of the groove on which the opening is provided, and
the guide surface of the second frame is provided for each leg of the pair of legs so that the guide surface is inclined with respect to the depth direction of the groove in such a manner as to face the side of the groove on which the opening is provided.

6. The cover material attachment according to claim 5, wherein:
the first protrusion has an auxiliary guide surface disposed in a plane identical to a plane in which the guide surface of the first frame is disposed in a no-load state, and
the second protrusion has an auxiliary guide surface disposed in a plane identical to a plane in which the guide surface of the second frame is disposed in the no-load state.

7. The cover material attachment according to claim 5, wherein:
the first support has an intermediate guide disposed in a plane identical to a plane in which the guide surface of the first frame is disposed in a no-load state, and
the second support has an intermediate guide disposed in a plane identical to a plane in which the guide surface of the second frame is disposed in the no-load state.

8. The cover material attachment according to claim 1, wherein the first frame and the second frame each comprise:
a riser portion that extends from the base,
a guide that extends from the riser portion in a direction inclined with respect to a depth direction of the groove, the guide being configured to guide the engaging member to the space, and
a fixing portion that extends from the guide toward an outer side of the groove in the width direction, the fixing portion being inserted into the cushion material.

* * * * *